US012680910B2

(12) United States Patent
Strzępek

(10) Patent No.: US 12,680,910 B2
(45) Date of Patent: Jul. 14, 2026

(54) COMBUSTION TEST RIG

(71) Applicant: Pratt & Whitney Canada Corp.,
Longueuil (CA)

(72) Inventor: Jakub Strzępek, Rzeszów (PL)

(73) Assignee: Pratt & Whitney Canada Corp.,
Longueuil (CA)

( * ) Notice: Subject to any disclaimer, the term of this
patent is extended or adjusted under 35
U.S.C. 154(b) by 340 days.

(21) Appl. No.: 18/371,910

(22) Filed: Sep. 22, 2023

(65) Prior Publication Data

US 2025/0102402 A1      Mar. 27, 2025

(51) Int. Cl.
G01M 15/14      (2006.01)
G01M 15/02      (2006.01)

(52) U.S. Cl.
CPC ............ G01M 15/02 (2013.01); G01M 15/14
(2013.01)

(58) Field of Classification Search
CPC .............................. G01M 15/02; G01M 15/14
See application file for complete search history.

(56) References Cited

U.S. PATENT DOCUMENTS

| | | | | | |
|---|---|---|---|---|---|
| 3,899,878 | A | * | 8/1975 | Compton | .............. F01D 17/085 |
| | | | | | 73/30.01 |
| 4,860,533 | A | * | 8/1989 | Joshi | ........................ F02C 7/264 |
| | | | | | 60/776 |
| 5,257,496 | A | * | 11/1993 | Brown | .................... F23N 5/082 |
| | | | | | 60/773 |
| 8,196,410 | B2 | * | 6/2012 | Patel | ........................ F23R 3/283 |
| | | | | | 60/740 |

| | | | | | |
|---|---|---|---|---|---|
| 12,072,104 | B1 | * | 8/2024 | Strzepek | ................. F23D 14/58 |
| 2014/0237989 | A1 | * | 8/2014 | Davenport | .............. F02C 7/264 |
| | | | | | 60/39.821 |
| 2016/0212360 | A1 | * | 7/2016 | Williams | ............... H04N 23/23 |
| 2018/0209296 | A1 | * | 7/2018 | DeAscanis | ............ F01D 21/003 |
| 2022/0243594 | A1 | * | 8/2022 | Blaszczak | ............. F01D 25/243 |

FOREIGN PATENT DOCUMENTS

| | | |
|---|---|---|
| CN | 108627346 B | 7/2021 |
| CN | 115728067 A | 3/2023 |
| CN | 115792083 A | 3/2023 |
| CN | 115950914 B | 7/2023 |
| CN | 115728067 B | 7/2024 |

OTHER PUBLICATIONS

EP Search Report for EP Patent Application No. 24201908.1 dated
Feb. 13, 2025.

* cited by examiner

*Primary Examiner* — Eric S. McCall
(74) *Attorney, Agent, or Firm* — Getz Balich LLC

(57) ABSTRACT

A combustion test rig is provided that includes a housing and
a combustor test section. The housing includes a test cham-
ber, a cavity, an inner wall and an outer wall. The cavity
extends vertically between the inner wall and the outer wall.
The inner wall is disposed vertically between the test
chamber and the cavity. The inner wall includes an inner
window. The outer wall includes an outer window. The
combustor test section is disposed within the test chamber.
The combustor test section includes a combustion chamber,
a first liner, a second liner and a bulkhead. The combustion
chamber extends vertically between the first liner and the
second liner. The first liner is disposed vertically between
the combustion chamber and the inner wall. The first liner
includes a liner window. A line of sight extends sequentially
through the outer window, the inner window and the liner
window into the combustion chamber.

17 Claims, 4 Drawing Sheets

COMBUSTION TEST RIG

TECHNICAL FIELD

This disclosure relates generally to a gas turbine engine and, more particularly, to a combustion test rig for testing one or more components of the gas turbine engine.

BACKGROUND INFORMATION

Various types and configurations of combustion test rigs are known in the art for testing one or more components of a gas turbine engine. While these known combustion test rigs have various benefits, there is still room in the art for improvement.

SUMMARY

According to an aspect of the present disclosure, a combustion test rig is provided that includes a housing and a combustor test section. The housing includes a test chamber, a cavity, an inner wall and an outer wall. The cavity extends vertically between the inner wall and the outer wall. The inner wall is disposed vertically between and fluidly separates the test chamber and the cavity. The inner wall includes an inner window. The outer wall includes an outer window. The combustor test section is disposed within the test chamber. The combustor test section includes a combustion chamber, a first liner, a second liner and a bulkhead. The combustion chamber extends vertically between the first liner and the second liner and longitudinally to the bulkhead. The first liner is disposed vertically between the combustion chamber and the inner wall. The first liner includes a liner window. A line of sight extends sequentially through the outer window, the inner window and the liner window into the combustion chamber.

According to another aspect of the present disclosure, another combustion test rig is provided that includes a housing and a combustor test section. The housing includes a test chamber and a wall forming an outer peripheral boundary of the test chamber. The wall includes a first window formed from transparent material. The combustor test section is disposed within the test chamber. The combustor test section includes a combustion chamber, a first liner, a second liner and a bulkhead. The combustion chamber extends vertically between the first liner and the second liner and longitudinally to the bulkhead. The first liner includes a second window formed from transparent material. One or more apertures extend vertically through the second window from the test chamber to the combustion chamber. A line of sight extends from an exterior of the housing, sequentially through the first window and the second window, into the combustion chamber.

According to still another aspect of the present disclosure, a test method is provided during which fuel is directed into a combustion chamber of a combustor test section. Air is directed through one or more apertures into the combustion chamber. The one or more apertures project through a liner window which forms an outer peripheral boundary of the combustion chamber. A mixture of the fuel and the air is combusted within the combustion chamber to generate combustion products. A laser beam is directed into the combustion chamber through the liner window to illuminate particles in the combustion products.

The test method may also include capturing an image of the particles illuminated by the laser beam.

The fuel may be or otherwise include hydrogen gas.

The housing may also include a third window aligned with and outboard of the first window. The line of sight may extend from the exterior of the housing, sequentially through the third window, the first window and the second window, into the combustion chamber.

The combustion test rig may also include a light source arranged outside of the housing. The light source may be configured to direct a beam of light along the line of sight sequentially through the outer window, the inner window and the liner window into the combustion chamber.

The beam of light may be a laser knife beam.

The housing may also include a second inner wall and a second outer wall. The second inner wall may be disposed laterally between the combustor test section and the second outer wall. The second inner wall may include a second inner window. The second outer wall may include a second outer window. A second line of sight may extend sequentially through the second outer window and the second inner window into the combustion chamber.

The combustion test rig may also include a laser and a camera. The laser may be configured to direct a laser beam along the line of sight sequentially through the outer window, the inner window and the liner window into the combustion chamber. The camera may be configured to capture an image of particles illuminated by the laser beam.

One or more apertures may extend vertically through the liner window. The liner window may be configured to direct air from the test chamber, through the one or more apertures, into the combustion chamber.

A plurality of apertures may extend vertically through the liner window and may be laterally spaced along the liner window.

A plurality of apertures may extend vertically through the liner window and may be longitudinally spaced along the liner window.

The first liner may also include a liner base with a base port. The base port may extend vertically through the liner base. The liner window may cover the base port and may be abutted vertically against the liner base.

The combustion test rig may also include a mount extending between and engaged with the first liner and the inner wall. The mount may be configured to bias the liner window vertically against the liner base.

The mount may be configured as or otherwise include a spring bracket.

The first liner may also include a liner frame with a frame port. The liner window may be clamped vertically between the liner frame and the liner base. The frame port may extend vertically through the liner frame and is aligned with the base port.

The combustion test rig may also include a compressed air source outside of the housing. The compressed air source may be fluidly coupled with the test chamber and the cavity.

The combustion test rig may also include a fuel injector mated with the combustor test section. The fuel injector may be configured to inject fuel into the combustion chamber for combustion.

The combustion test rig may also include a hydrogen fuel source fluidly coupled with and configured to provide the fuel to the fuel injector. The fuel injected into the combustion chamber may be hydrogen gas.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
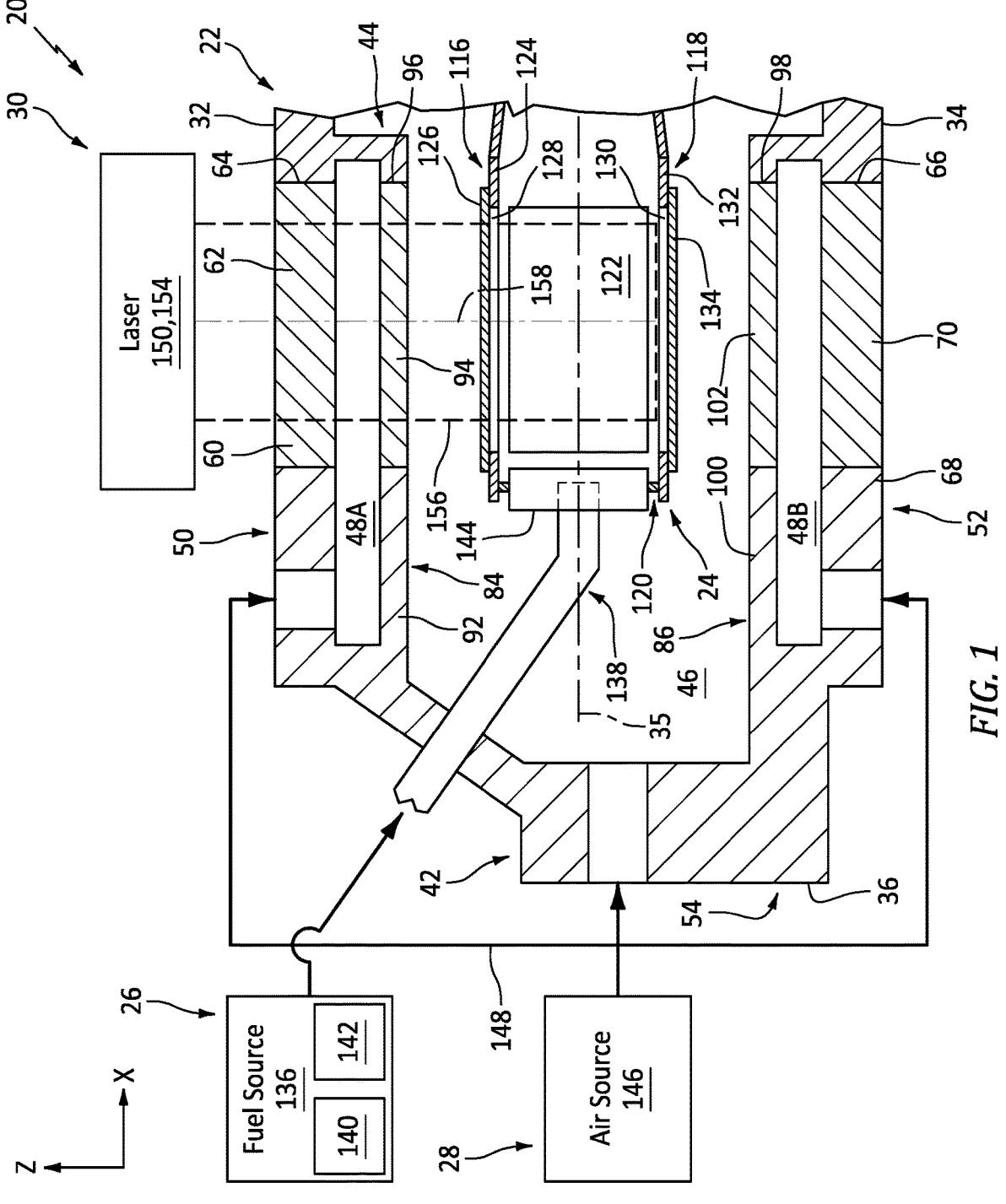
FIG. 1 is a partial sectional schematic illustration of a combustion test rig along a vertical plane.
Figure 2:
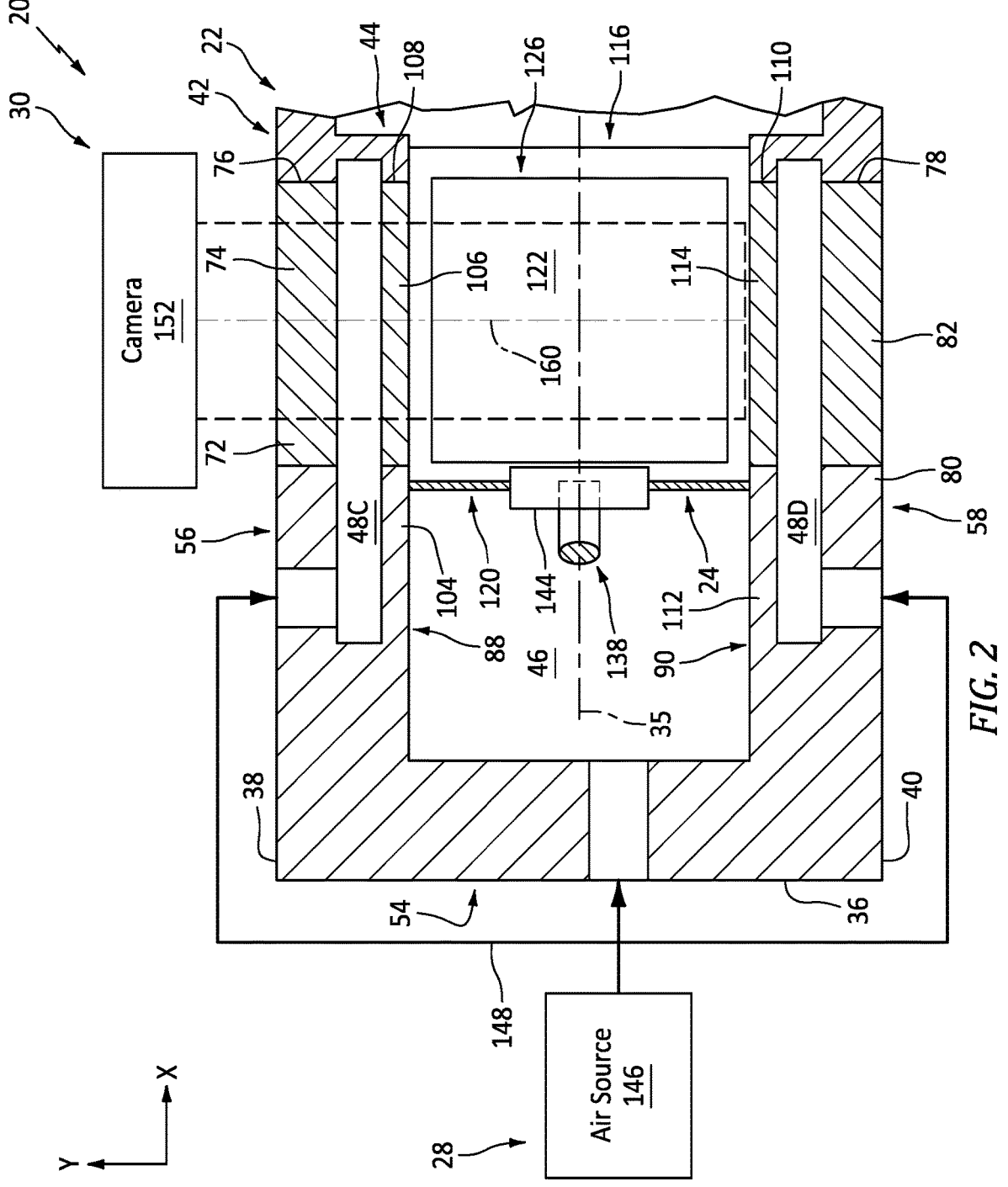
FIG. 2 is a partial sectional schematic illustration of the combustion test rig along a horizontal plane.

FIGS. 1 and 2 illustrate a combustion test rig 20 for testing one or more components of a gas turbine engine. Examples of the gas turbine engine include, but are not limited to, a turbofan engine, a turbojet engine, a turboprop engine, a turboshaft engine, an auxiliary power unit (APU) engine and an industrial engine. The combustion test rig 20 of FIGS. 1 and 2 includes a tested rig housing 22, a combustor test section 24, a fuel system 26, an air system 28 and an inspection system 30.

Referring to FIG. 1, the rig housing 22 extends vertically (e.g., along a vertical z-axis) between a vertical first side 32 (e.g., a top side, or a bottom side) of the rig housing 22 and a vertical second side 34 (e.g., a bottom side, or a top side). The rig housing 22 extends longitudinally along a longitudinal centerline 35 (e.g., along a longitudinal x-axis) between a longitudinal upstream end 36 of the rig housing 22 and a longitudinal downstream end of the rig housing 22 (not visible in FIG. 1). Briefly, the longitudinal centerline 35 may be a centerline of the rig housing 22 and/or the combustor test section 24. Referring to FIG. 2, the rig housing 22 extends laterally (e.g., along a lateral y-axis) between opposing lateral sides 38 and 40 of the rig housing 22. Here, the x-axis and the y-axis are shown in a gravitational horizontal plane; however, the present disclosure is not limited to such an exemplary combustion test rig arrangement with respect to gravity. The rig housing 22 of FIGS. 1 and 2 includes an outer casing 42 (e.g., an exterior casing), an inner casing 44 (e.g., an interior casing), an internal test chamber 46 and one or more peripheral cooling cavities 48A-D (generally referred to as "48"). Briefly, the cooling cavities 48 may be configured as fluidly discrete (e.g., separate) cavities. Alternatively, some or all of the cooling cavities 48 may collectively form a single (e.g., annular) cooling cavity extending about (e.g., completely around) the test chamber 46.

Referring to FIG. 1, the outer casing 42 includes a vertical first outer wall 50, a vertical second outer wall 52 and a housing endwall 54. Referring to FIG. 2, the outer casing 42 also includes a lateral first outer wall 56 and a lateral second outer wall 58. Each of the outer walls 50, 52, 56, 58 of FIGS. 1 and 2 extends longitudinally along the longitudinal centerline 35 to the housing endwall 54. Each of these outer walls 50, 52, 56, 58 is also connected to (e.g., formed integral with or otherwise attached to) the housing endwall 54. The vertical first outer wall 50 of FIG. 1 is disposed at (e.g., on, adjacent or proximate) the housing vertical first side 32. This vertical first outer wall 50 extends laterally between and is connected to the lateral first outer wall 56 and the lateral second outer wall 58 of FIG. 2. The vertical second outer wall 52 of FIG. 1 is disposed at the housing vertical second side 34. This vertical second outer wall 52 extends laterally between and is connected to the lateral first outer wall 56 and the lateral second outer wall 58 of FIG. 2.

The lateral first outer wall 56 of FIG. 2 is disposed at the housing lateral first side 38. This lateral first outer wall 56 extends vertically between and is connected to the vertical first outer wall 50 and the vertical second outer wall 52 of FIG. 1. The lateral second outer wall 58 of FIG. 2 is disposed at the housing lateral second side 40. This lateral second outer wall 58 extends vertically between and is connected to the vertical first outer wall 50 and the vertical second outer wall 52 of FIG. 1.

The vertical first outer wall 50 of FIG. 1 includes a vertical outer base 60 and a vertical outer window 62. The vertical outer base 60 may be constructed from an opaque material such as metal. This vertical outer base 60 includes a vertical outer base port 64 which projects vertically through the vertical first outer wall 50 and its vertical outer base 60. The vertical outer window 62 is (e.g., longitudinally and/or laterally) aligned with and seals off the vertical outer base port 64. The vertical outer window 62 of FIG. 1, for example, is mated with (e.g., disposed in) the vertical outer base port 64 and is inline with the vertical outer base 60. The vertical outer window 62 is constructed from a light transparent material such as quartz glass or sapphire.

The vertical second outer wall 52 may have a similar configuration to the vertical first outer wall 50. However, in the specific embodiment of FIG. 1, a port 66 in a base 68 of the vertical second outer wall 52 is plugged with an opaque plug 70 rather than mated with a transparent window. The plug 70, of course, may alternatively be replaced with a transparent window to provide additional visibility through the outer casing 42. Alternatively, the vertical second outer wall 52 may be configured as an un-interrupted opaque wall without a port for a plug or a window.

Referring to FIG. 2, the lateral first outer wall 56 includes a lateral outer base 72 and a lateral outer window 74. The lateral outer base 72 may be constructed from an opaque material such as metal. This lateral outer base 72 includes a lateral outer base port 76 which projects lateral through the lateral first outer wall 56 and its lateral outer base 72. The lateral outer window 74 is (e.g., longitudinally and/or vertically) aligned with and seals off the lateral outer base port 76. The lateral outer window 74 of FIG. 2, for example, is mated with (e.g., disposed in) the lateral outer base port 76 and is inline with the lateral outer base 72. The lateral outer window 74 is constructed from a light transparent material such as quartz glass or sapphire.

The lateral second outer wall 58 may have a similar configuration to the lateral first outer wall 56. However, in the specific embodiment of FIG. 2, a port 78 in a base 80 of the lateral second outer wall 58 is plugged with an opaque plug 82 rather than mated with a transparent window. The plug 82, of course, may alternatively be replaced with a transparent window to provide additional visibility through the outer casing 42. Alternatively, the lateral second outer wall 58 may be configured as an un-interrupted opaque wall without a port for a plug or a window.

Referring to FIG. 1, the inner casing 44 includes a vertical first inner wall 84 and a vertical second inner wall 86. Referring to FIG. 2, the inner casing 44 also includes a lateral first inner wall 88 and a lateral second inner wall 90. Each of the inner walls 84, 86, 88, 90 of FIGS. 1 and 2 extends longitudinally along the longitudinal centerline 35 to the housing endwall 54. Each of these inner walls 84, 86, 88, 90 is also connected to the housing endwall 54. An upstream portion of the vertical first inner wall 84 of FIG. 1 is spaced vertically inward from the vertical first outer wall 50. A downstream portion of the vertical first inner wall 84 projects vertically out to and may be connected to the outer casing 42 and its vertical first outer wall 50. This vertical first inner wall 84 extends laterally between and is connected to the lateral first inner wall 88 and the lateral second inner wall 90 of FIG. 2. An upstream portion of the vertical second inner wall 86 of FIG. 1 is spaced vertically inward from the vertical second outer wall 52. A downstream portion of the vertical second inner wall 86 projects vertically out to and may be connected to the outer casing 42 and its vertical second outer wall 52. This vertical second inner wall 86 extends laterally between and is connected to the lateral first inner wall 88 and the lateral second inner wall 90 of FIG. 2. An upstream portion of the lateral first inner wall 88 of FIG. 2 is spaced laterally inward from the lateral first outer wall 56. A downstream portion of the lateral first inner wall 88 projects laterally out to and may be connected to the outer casing 42 and its lateral first outer wall 56. This lateral first inner wall 88 extends vertically between and is connected to the vertical first inner wall 84 and the vertical second inner wall 86 of FIG. 1. An upstream portion of the lateral second inner wall 90 of FIG. 2 is spaced laterally inward from the lateral second outer wall 58. A downstream portion of the lateral second inner wall 90 projects laterally out to and may be connected to the outer casing 42 and its lateral second outer wall 58. This lateral second inner wall 90 extends vertically between and is connected to the vertical first inner wall 84 and the vertical second inner wall 86 of FIG. 1.

Referring to FIG. 1, the vertical first inner wall 84 includes a vertical inner base 92 and a vertical inner window 94. The vertical inner base 92 may be constructed from an opaque material such as metal. This vertical inner base 92 includes a vertical inner base port 96 which projects vertically through the vertical first inner wall 84 and its vertical inner base 92. The vertical inner window 94 is (e.g., longitudinally and/or laterally) aligned with and seals off the vertical inner base port 96. The vertical inner window 94 of FIG. 1, for example, is mated with (e.g., disposed in) the vertical inner base port 96 and is inline with the vertical inner base 92. The vertical inner window 94 is constructed from a light transparent material such as quartz glass or sapphire.

The vertical second inner wall 86 may have a similar configuration to the vertical first inner wall 84. However, in the specific embodiment of FIG. 1, a port 98 in a base 100 of the vertical second inner wall 86 is plugged with an opaque plug 102 rather than mated with a transparent window. The plug 102, of course, may alternatively be replaced with a transparent window to provide additional visibility through the inner casing 44. Alternatively, the vertical second inner wall 86 may be configured as an un-interrupted opaque wall without a port for a plug or a window.

Referring to FIG. 2, the lateral first inner wall 88 includes a lateral inner base 104 and a lateral inner window 106. The lateral inner base 104 may be constructed from an opaque material such as metal. This lateral inner base 104 includes a lateral inner base port 108 which projects lateral through the lateral first inner wall 88 and its lateral inner base 104. The lateral inner window 106 is (e.g., longitudinally and/or vertically) aligned with and seals off the lateral inner base port 108. The lateral inner window 106 of FIG. 2, for example, is mated with (e.g., disposed in) the lateral inner base port 108 and is inline with the lateral inner base 104. The lateral inner window 106 is constructed from a light transparent material such as quartz glass or sapphire.

The lateral second inner wall 90 may have a similar configuration to the lateral first inner wall 88. However, in the specific embodiment of FIG. 2, a port 110 in a base 112 of the lateral second inner wall 90 is plugged with an opaque plug 114 rather than mated with a transparent window. The plug 114, of course, may alternatively be replaced with a transparent window to provide additional visibility through the inner casing 44. Alternatively, the lateral second inner wall 90 may be configured as an un-interrupted opaque wall without a port for a plug or a window.

The test chamber 46 of FIGS. 1 and 2 is collectively formed by the outer casing 42 and the inner casing 44. The test chamber 46 of FIGS. 1 and 2, for example, extends longitudinally along the longitudinal centerline 35 within the rig housing 22 to the housing endwall 54. The housing endwall 54 may thereby form a longitudinal outer peripheral boundary of the test chamber 46.

An upstream portion of the test chamber 46 of FIG. 1 extends vertically between and to the vertical first inner wall 84 and the vertical second inner wall 86. The vertical inner walls 84, 86 and their members 92 and 94, 100 and 102 may thereby form respective vertical outer peripheral boundaries of the upstream portion of the test chamber 46. A downstream portion of the test chamber 46 (partially shown in FIG. 1) extends vertically between and to the vertical first outer wall 50 and the vertical second outer wall 52. The vertical outer walls 50, 52 and their members 60, 68 may thereby form respective vertical outer peripheral boundaries of the downstream portion of the test chamber 46.

The upstream portion of the test chamber 46 of FIG. 2 extends laterally between and to the lateral first inner wall 88 and the lateral second inner wall 90. The lateral inner walls 88, 90 and their members 104 and 106, 112 and 114 may thereby form respective lateral outer peripheral boundaries of the upstream portion of the test chamber 46. The downstream portion of the test chamber 46 (partially shown in FIG. 2) extends lateral between and to the lateral first outer wall 56 and the lateral second outer wall 58. The lateral outer walls 56, 58 and their members 72, 80 may thereby form respective lateral outer peripheral boundaries of the downstream portion of the test chamber 46.

The cooling cavities 48 of FIGS. 1 and 2 are collectively formed by the outer casing 42 and the inner casing 44. The vertical first cooling cavity 48A of FIG. 1, for example, extends vertically between and to the upstream portion of the vertical first inner wall 84 and the vertical first outer wall 50. This vertical first cooling cavity 48A extends longitudinally between the housing endwall 54 and the downstream portion of the vertical first inner wall 84. The vertical first inner wall 84 and its members 92 and 94 may thereby form an inner peripheral boundary of the vertical first cooling cavity 48A. Here, the vertical first inner wall 84 is disposed vertically between and may fluidly separate the test chamber 46 from the vertical first cooling cavity 48A. The vertical first outer wall 50 and its members 60 and 62 may form an outer peripheral boundary of the vertical first cooling cavity 48A.

The vertical second cooling cavity 48B of FIG. 1 extends vertically between and to the upstream portion of the vertical second inner wall 86 and the vertical second outer wall 52. This vertical second cooling cavity 48B extends longitudinally between the housing endwall 54 and the downstream portion of the vertical second inner wall 86. The vertical second inner wall 86 and its members 100 and 102 may thereby form an inner peripheral boundary of the vertical second cooling cavity 48B. Here, the vertical second inner wall 86 is disposed vertically between and may fluidly separate the test chamber 46 from the vertical second cooling cavity 48B. The vertical second outer wall 52 and its members 68 and 70 may form an outer peripheral boundary of the vertical second cooling cavity 48B.

The lateral first cooling cavity 48C of FIG. 2 extends laterally between and to the upstream portion of the lateral first inner wall 88 and the lateral first outer wall 56. This lateral first cooling cavity 48C extends longitudinally between the housing endwall 54 and the downstream portion of the lateral first inner wall 88. The lateral first inner wall 88 and its members 104 and 106 may thereby form an inner peripheral boundary of the lateral first cooling cavity 48C. Here, the lateral first inner wall 88 is disposed laterally between and may fluidly separate the test chamber 46 from the lateral first cooling cavity 48C. The lateral first outer wall 56 and its members 72 and 74 may form an outer peripheral boundary of the lateral first cooling cavity 48C.

The lateral second cooling cavity 48D of FIG. 2 extends laterally between and to the upstream portion of the lateral second inner wall 90 and the lateral second outer wall 58. This lateral second cooling cavity 48D extends longitudinally between the housing endwall 54 and the downstream portion of the lateral second inner wall 90. The lateral second inner wall 90 and its members 112 and 114 may thereby form an inner peripheral boundary of the lateral second cooling cavity 48D. Here, the lateral second inner wall 90 is disposed laterally between and may fluidly separate the test chamber 46 from the lateral second cooling cavity 48D. The lateral second outer wall 58 and its members 80 and 82 may form an outer peripheral boundary of the lateral second cooling cavity 48D.

Referring to FIG. 1, the combustor test section 24 is disposed within the test chamber 46. This combustor test section 24 includes a first liner 116 (e.g., a top combustor sidewall, or a bottom combustor sidewall), a second liner 118 (e.g., a bottom combustor sidewall, or a top combustor sidewall), a bulkhead 120 (e.g., a combustor endwall) and an internal combustion chamber 122. Each of the combustor walls 116, 118 and 120 extends laterally between and may be connected to the lateral first inner wall 88 and the lateral second inner wall 90 of FIG. 2. The first liner 116 of FIG. 1 projects longitudinally out from the bulkhead 120 along the longitudinal centerline 35 to a distal end of the first liner 116. This first liner 116 is spaced vertically inward from and may (or may not) be parallel with the upstream portion of the vertical first inner wall 84. The second liner 118 projects longitudinally out from the bulkhead 120 along the longitudinal centerline 35 to a distal end of the second liner 118. This second liner 118 is spaced vertically inward from and may (or may not) be parallel with the upstream portion of the vertical second inner wall 86. The bulkhead 120 extends vertically between and is connected to the first liner 116 and the second liner 118.

The first liner 116 includes a first liner base 124 and a first liner window 126. The first liner base 124 may be constructed from an opaque material such as metal. This first liner base 124 includes a first liner base port 128 which projects vertically through the first liner 116 and its first liner base 124. The first liner window 126 is (e.g., longitudinally and/or laterally) aligned with and seals off the first liner base port 128. The first liner window 126 of FIG. 1, for example, (e.g., longitudinally and laterally) covers the first liner base port 128. The first liner window 126 is constructed from a light transparent material such as quartz glass or sapphire.

The second liner 118 may have a similar configuration to the first liner 116. However, in the specific embodiment of FIG. 1, a port 130 in a base 132 of the second liner 118 is plugged with an opaque plug 134 rather than mated with a transparent window. The plug 134, of course, may alternatively be replaced with a transparent window to provide additional visibility into the combustion chamber 122. Alternatively, the second liner 118 may be configured as an un-interrupted opaque wall without a port for a plug or a window.

The combustion chamber 122 is formed within the combustor test section 24 by the combustor walls 116, 118 and 120. The combustion chamber 122 of FIG. 1, for example, extends vertically between and to the first liner 116 and the second liner 118. The first liner 116 and its members 124 and 126 may thereby form a vertical first outer peripheral boundary of the combustion chamber 122, where the first liner 116 is vertically between and fluidly separates the test chamber 46 and the combustion chamber 122. The second liner 118 and its members 132 and 134 may form a vertical second outer peripheral boundary of the combustion chamber 122, where the second liner 118 is vertically between and fluidly separates the test chamber 46 and the combustion chamber 122. The combustion chamber 122 projects longitudinally along the longitudinal centerline 35 into the combustor test section 24 to the bulkhead 120. The bulkhead 120 may thereby form a longitudinal outer peripheral boundary of the combustion chamber 122, where the bulkhead 120 is longitudinally between and fluidly separates the test chamber 46 and the combustion chamber 122. Referring to FIG. 2, the combustion chamber 122 is disposed and extends laterally between and to the lateral first inner wall 88 and the lateral second inner wall 90. The lateral first inner wall 88 and its members 104 and 106 may thereby form a lateral first outer peripheral boundary of the combustion chamber 122, where the lateral first inner wall 88 is laterally between and fluidly separates the lateral first cooling cavity 48C and the combustion chamber 122. The lateral second inner wall 90 and its members 112 and 114 may form a lateral second outer peripheral boundary of the combustion chamber 122, where the lateral second inner wall 90 is laterally between and fluidly separates the lateral second cooling cavity 48D and the combustion chamber 122.

Referring to FIG. 1, the fuel system 26 includes a fuel source 136 and a fuel injector 138. The fuel source 136 of FIG. 1 is located outside of the rig housing 22 and includes a fuel reservoir 140 and a fuel flow regulator 142. The fuel reservoir 140 is configured to store a quantity of fuel (e.g., hydrogen fuel or any other gaseous or liquid fuel) before, during and/or after combustion test rig operation. The fuel reservoir 140, for example, may be configured as or otherwise include a tank, a cylinder, a pressure vessel, a bladder or any other type of (e.g., insulated) fuel storage container. The fuel flow regulator 142 is configured to direct a flow of the fuel from the fuel reservoir 140 to the fuel injector 138 for injection into the combustion chamber 122. The fuel flow regulator 142, for example, may be configured as or otherwise include a fuel compressor, a fuel pump and/or a fuel valve (or valves). The fuel injector 138 includes a nozzle mated with the combustor test section 24 and its bulkhead 120. The fuel injector 138 may optionally also include an air swirler 144 circumscribing the nozzle at the bulkhead 120.

The air system 28 includes a compressed air source 146 such as an air compressor and/or a compressed air reservoir. The compressed air source 146 of FIG. 1 is disposed outside of the rig housing 22. The compressed air source 146 is fluidly coupled to the test chamber 46 and each of the cooling cavities 48 of FIGS. 1 and 2 through an air circuit 148. The air circuit 148, for example, may fluidly couple the compressed air source 146 to the various internal volumes 46 and 48A-D in parallel. With such an arrangement, the air system 28 may deliver compressed air into each internal volume 46, 48 at a substantially common (the same) pressure. The present disclosure, however, is not limited to such an exemplary arrangement.

The inspection system 30 of FIGS. 1 and 2 includes a light source 150 (see FIG. 1) and a camera 152 (see FIG. 2). The light source 150 of FIG. 1 is disposed outside of the rig housing 22 and may be configured as a laser 154. This laser 154 is configured to direct a laser beam 156 (e.g., a laser knife beam) along a vertical line of sight 158 vertically (e.g., uninterrupted) from an exterior of the rig housing 22, sequentially through the vertical outer window 62, the vertical inner window 94 and the first liner window 126, into the combustion chamber 122. The camera 152 of FIG. 2 is also disposed outside of the rig housing 22. This camera 152 has a lateral line of sight 160 laterally (e.g., uninterrupted) from the exterior of the rig housing 22, sequentially through the lateral outer window 74 and the lateral inner window 106, into the combustion chamber 122.

During operation of the combustion test rig 20, the fuel system 26 directs fuel from the fuel source 136 to the fuel injector 138 and the fuel injector 138 injects the fuel (e.g., hydrogen ($H_2$) gas) into the combustion chamber 122. Compressed air from the test chamber 46 is directed into the combustion chamber 122 through the air swirler 144 and/or various other apertures in the combustor walls; e.g., the first liner 116 and the second liner 118. The fuel mixes with the compressed air to provide a fuel-air mixture. This fuel air mixture is ignited by an ignitor (not visible in FIG. 1) to generate combustion products. These combustion products flow through and out of the combustor test section 24, and may be exhausted from the combustion test rig 20 through a test rig exhaust. During the combustion process, the laser 154 directs its laser beam 156 into the combustion chamber 122 to illuminate (e.g., highlight) various particles in the combustion products (and/or unburnt fuel-air mixture). The camera 152 captures one or more images of these illuminated particles to provide image data. This image data may then be processed to provide information regarding various aspects of the combustion process. Notably, by configuring the combustion test rig 20 with the combustor test section 24 and its combustor walls 116, 118 and 120, the combustion dynamics may be closer to that within an actual (e.g., production) gas turbine engine combustor compared to, for example, a rig which examines combustion within a single large test chamber.

Figures 3, 4:
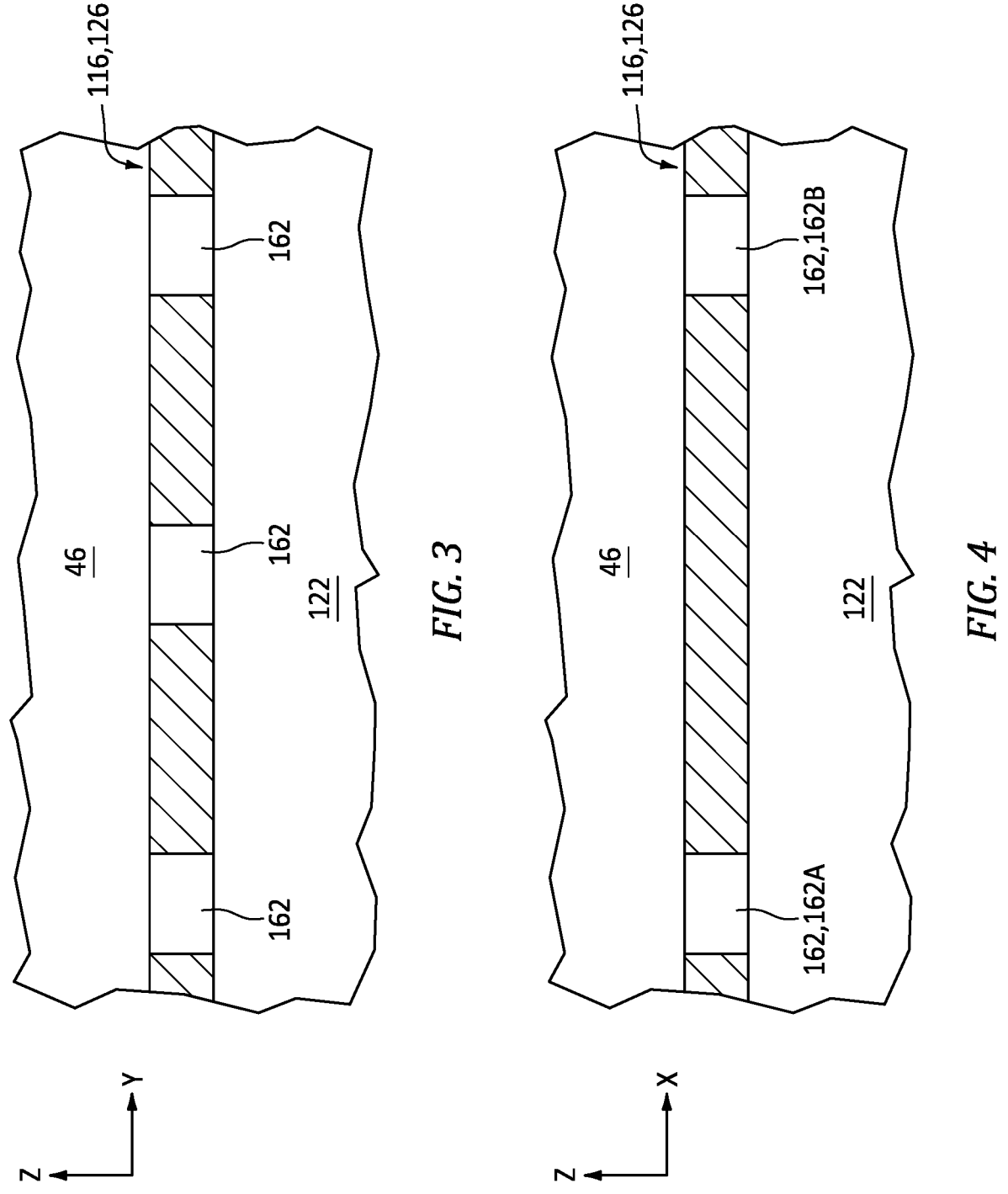
FIGS. 3 and 4 are partial sectional illustrations of the combustion test rig at a liner window along various vertical planes.

In some embodiments, referring to FIG. 3, the first liner 116 and its first liner window 126 may be configured with one or more apertures 162; e.g., through holes. The apertures 162 of FIG. 3 are arranged in a laterally extending array, where the apertures 162 within this array are laterally spaced from one another along the first liner 116 and its first liner window 126. Each of the apertures 162 extends vertically through the first liner 116 and its first liner window 126 from the test chamber 46 to the combustion chamber 122. Each aperture 162 may thereby direct a jet of the compressed air from the test chamber 46 into the combustion chamber 122 during combustion test rig operation. Examples of the apertures 162 include, but are not limited to, primary air holes, dilution air holes or even cooling holes. Referring to FIG. 4, the apertures 162 may also or alternatively be spaced longitudinally along the first liner 116 and its first liner window 126. Here, each first aperture 162A may be configured as a primary air hole and each second aperture 162B may be configured as a dilution air hole. However, in other embodiments, it is contemplated the first aperture(s) 162A or the second aperture(s) 162B may be omitted. Moreover, it is also contemplated the second liner 118 of FIG. 1 may also or alternatively include one or more similar apertures.

Figure 5:
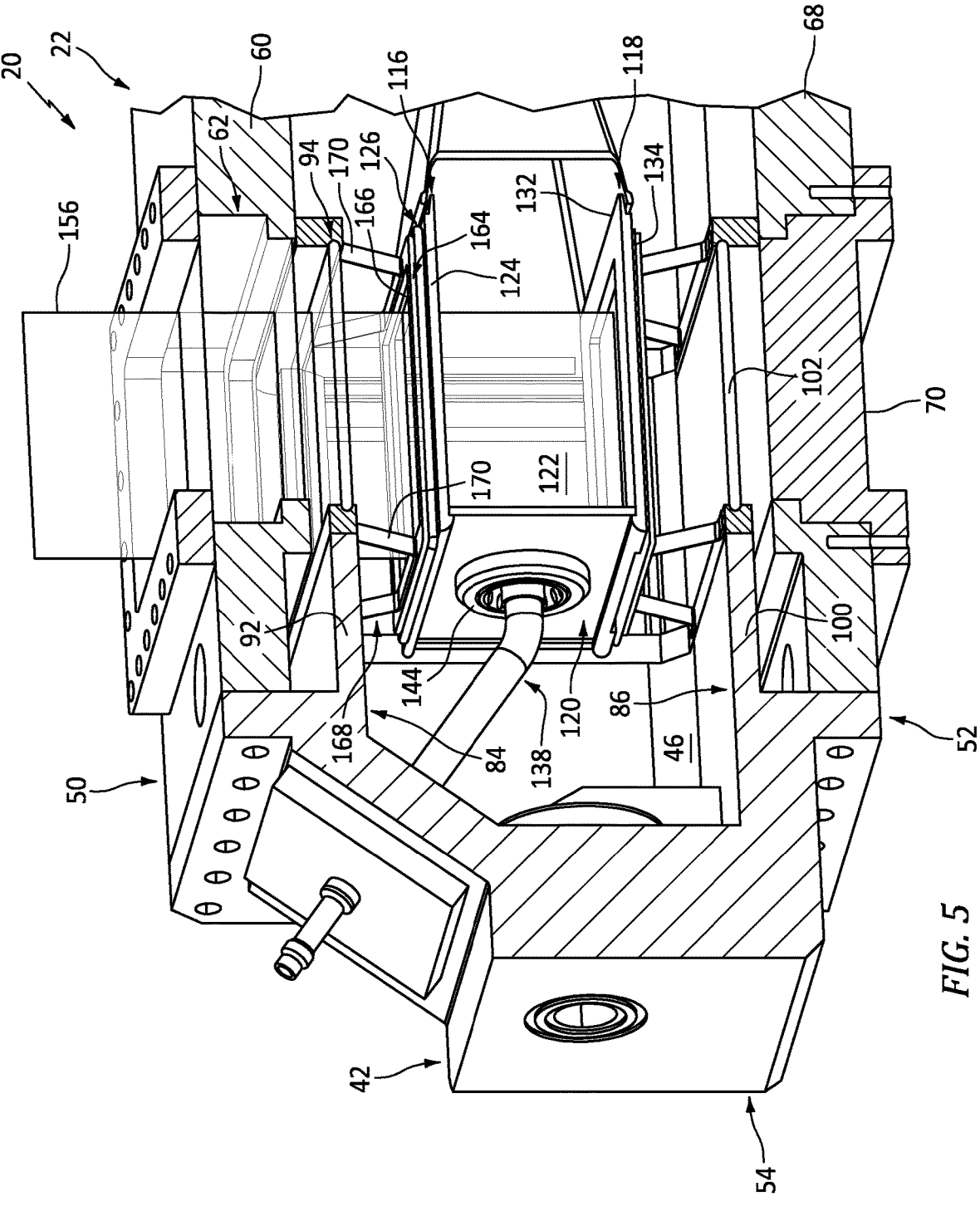
FIG. 5 is a partial perspective cutaway illustration of the combustion test rig.

In some embodiments, referring to FIG. 5, the first liner window 126 may be outside of the combustion chamber 122 and abutted vertically against the first liner base 124. The first liner 116 of FIG. 5, for example, also includes a first liner frame 164 with a first liner frame port 166 that extends vertically through the first liner frame 164. The first liner window 126 is arranged vertically between and engages (e.g., contacts) the first liner base 124 and the first liner frame 164. More particularly, the first liner window 126 of FIG. 5 is pressed (e.g., clamped) vertically between the first liner base 124 and the first liner frame 164. Here, the first liner frame port 166 is (e.g., longitudinally and/or laterally) aligned with the first liner base port 128 (see FIG. 1) such that the vertical line of sight 158 (see FIG. 1) may pass across the first liner 116. The first liner frame 164 may be held and pressed against the first liner window 126 by a mount 168. This mount 168 extend vertically between and is engaged with the vertical first inner wall 84 and the first liner 116 and its first liner frame 164. The mount 168 of FIG. 5 is configured to (e.g., spring) bias the first liner window 126 vertically against the first liner base 124. The mount 168 of FIG. 5, for example, includes one or more spring brackets 170 compressed vertically between the first liner frame 164 and the vertical first inner wall 84 and its vertical inner base 92.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A combustion test rig, comprising:
a housing including a test chamber, a cavity, an inner wall and an outer wall, the cavity extending vertically between the inner wall and the outer wall, the inner wall disposed vertically between and fluidly separating the test chamber and the cavity, the inner wall comprising an inner window, and the outer wall comprising an outer window; and
a combustor test section disposed within the test chamber, the combustor test section including a combustion chamber, a first liner, a second liner and a bulkhead, the combustion chamber extending vertically between the first liner and the second liner and longitudinally to the bulkhead, the first liner disposed vertically between the combustion chamber and the inner wall, and the first liner comprising a liner window;
wherein a line of sight extends sequentially through the outer window, the inner window and the liner window into the combustion chamber.

2. The combustion test rig of claim 1, further comprising:
a light source arranged outside of the housing;
the light source configured to direct a beam of light along the line of sight sequentially through the outer window, the inner window and the liner window into the combustion chamber.

3. The combustion test rig of claim 2, wherein the beam of light comprises a laser knife beam.

4. The combustion test rig of claim 1, wherein the housing further includes a second inner wall and a second outer wall;

the second inner wall is disposed laterally between the combustor test section and the second outer wall, and the second inner wall comprises a second inner window;

the second outer wall comprises a second outer window; and a second line of sight extends sequentially through the second outer window and the second inner window into the combustion chamber.

5. The combustion test rig of claim 4, further comprising:

a laser configured to direct a laser beam along the line of sight sequentially through the outer window, the inner window and the liner window into the combustion chamber; and a camera configured to capture an image of particles illuminated by the laser beam.

6. The combustion test rig of claim 1, wherein one or more apertures extend vertically through the liner window; and the liner window is configured to direct air from the test chamber, through the one or more apertures, into the combustion chamber.

7. The combustion test rig of claim 1, wherein a plurality of apertures extend vertically through the liner window and are laterally spaced along the liner window.

8. The combustion test rig of claim 1, wherein a plurality of apertures extend vertically through the liner window and are longitudinally spaced along the liner window.

9. The combustion test rig of claim 1, wherein the first liner further comprises a liner base with a base port;

the base port extends vertically through the liner base; and the liner window covers the base port and is abutted vertically against the liner base.

10. The combustion test rig of claim 9, further comprising:

a mount extending between and engaged with the first liner and the inner wall;

the mount configured to bias the liner window vertically against the liner base.

11. The combustion test rig of claim 10, wherein the mount comprises a spring bracket.

12. The combustion test rig of claim 9, wherein the first liner further comprises a liner frame with a frame port;

the liner window is clamped vertically between the liner frame and the liner base; and the frame port extends vertically through the liner frame and is aligned with the base port.

13. The combustion test rig of claim 1, further comprising:

a compressed air source outside of the housing;

the compressed air source fluidly coupled with the test chamber and the cavity.

14. The combustion test rig of claim 1, further comprising:

a fuel injector mated with the combustor test section;

the fuel injector configured to inject fuel into the combustion chamber for combustion.

15. The combustion test rig of claim 14, further comprising:

a hydrogen fuel source fluidly coupled with and configured to provide the fuel to the fuel injector;

wherein the fuel injected into the combustion chamber comprises hydrogen gas.

16. A combustion test rig, comprising:

a housing including a test chamber and a wall forming an outer peripheral boundary of the test chamber, the wall comprising a first window formed from transparent material; and a combustor test section disposed within the test chamber, the combustor test section including a combustion chamber, a first liner, a second liner and a bulkhead, the combustion chamber extending vertically between the first liner and the second liner and longitudinally to the bulkhead, the first liner comprising a second window formed from transparent material, wherein one or more apertures extend vertically through the second window from the test chamber to the combustion chamber;

wherein a line of sight extends from an exterior of the housing, sequentially through the first window and the second window, into the combustion chamber.

17. The combustion test rig of claim 16, wherein the housing further includes a third window aligned with and outboard of the first window; and the line of sight extends from the exterior of the housing, sequentially through the third window, the first window and the second window, into the combustion chamber.

* * * * *